No. 788,132. Patented April 25, 1905.

UNITED STATES PATENT OFFICE.

GUILFORD C. GLYNN, OF IOLA, KANSAS, ASSIGNOR OF ONE-THIRD TO FRANK B. SMITH.

REFRACTORY MATERIAL AND METHOD OF MAKING SAME.

SPECIFICATION forming part of Letters Patent No. 788,132, dated April 25, 1905.

Application filed July 25, 1904. Serial No. 218,108.

*To all whom it may concern:*

Be it known that I, GUILFORD C. GLYNN, a citizen of the United States, residing at Iola, in the county of Allen and State of Kansas, have invented a new and useful Refractory Material and Method of Making the Same, (Case B,) of which the following is a specification.

This invention relates to refractory furnace-linings and method of making the same.

The object of the invention is to provide a lining adapted for use in connection with furnaces, retorts, or in any other position where a high-heat-resisting medium is requisite and which shall be at once capable of resisting any degree of heat and also the action of corrosive slags.

While the slag or lining is herein described as being in the form of a plastic mass to permit of its being applied to position in the manner of an ordinary plaster, it is to be understood that the compound may be molded into bricks or slabs and be used in the same manner as an ordinary refractory lining.

The slag is composed of the following ingredients in substantially the proportions specified by weight: Finely-divided aluminium, one part; ferric oxid, three parts; titanic iron ore containing approximately sixty per cent. of titanic oxid, four parts. In this mixture there will also be present a small percentage of impurities, such as silica, aluminium silicate, and other metallic oxids of no particular moment in the reaction. The aluminium constitutes a reagent and the titanic oxid an oxygen-supplying agent. In the selection of the ferric oxid care should be taken to ascertain the percentage of oxygen contained therein in order to secure the best results.

The ingredients named are thoroughly mixed and a suitable binding agent, such as a solution of ammonium chlorid of acid reaction and suitable strength, is added to the ingredients in quantity sufficient to secure a pasty mass, which can be applied like ordinary plaster to the walls of a retort, to bricks, or to other non-combustible material. When thoroughly dry, the compound hardens and closely adheres to the surface to which it is applied. Upon being subjected to suitable heat, the ammonium chlorid is volatilized and driven off, and the aluminium oxid abstracts the oxygen from the oxids in the compound, eliminating first the oxygen from the ferric oxid, as its heat of formation is less than that of the titanic or aluminium oxids. The heat will cause the fusion of the metals and forms a slag which reduces the aluminium silicate and silica on the surface of the retort to a soft condition and combines with such surface to form a lining that will protect the clay body or surface from the corrosive effects of any reaction that may take place in the retort, furnace, or the like, and, further, the coating operates to exclude vapors and gases, which would tend to render the slag less resistant to the action of heat and fluxes.

The invention may be further carried into effect by mixing finely-divided aluminium, calcium, silicon, and magnesium with metallic oxids and ores of different degrees of heat of formation, such as ferrous and ferric oxids, manganous and manganic oxids, cobaltic, chromic, titanic ores or oxids, and the like with the binding material or agent, with or without the addition of carbon or carbon compounds, and applying such mixture in a wet or damp state to the surface of the body to be coated and evaporating the moisture, thus to cause the mass to adhere firmly as a cementitious surface. When the material is subjected to heat, the less refractory oxids are reduced and transformed to a metallic state; but the most refractory oxids are not reduced or are only partially reduced. The metals present under the action of high heat attack the body to which the coating is applied and combines therewith in such manner as to be impossible of separation without material injury to the body.

It will of course be understood that the invention is not to be limited to the proportions of ingredients given nor to the metals and oxids stated, as it is desired to employ aluminium, magnesium, calcium, silicon, which by their oxidation with metallic oxids having different refractory powers form a protective slag. One formula, which may be employed in addition to that already stated, is as follows: aluminium, ten to fifteen per cent.; iron, twenty to fifty-six per cent.; oxygen, not to exceed twenty per cent.; titanium, fourteen to twenty per cent.

The underlying feature common to all of the compounds employed is that of generating sufficient heat by the chemical reaction between the aluminium and the oxygen compounds of iron to reduce them to a metallic state, but not to reduce the titanic oxid, the reaction being regulated in such manner as to produce sufficient heat to attack the retort or brick lining thereof with the heated metals to form a slag with the unreduced refractory titanic and aluminium oxids in solution, which on cooling leaves the non-reducible oxids in contact with and forming a part of the retort or body to which it is applied. Furthermore, the mixture may be made of aluminium, silicon, magnesium, and calcium as a reducing agent or agents.

Having thus described the invention, what is claimed is—

1. A compound to form a refractory material, consisting of finely-divided aluminium, ferric oxid, titanic iron ore, and a binding agent substantially in the proportion specified.

2. A compound to form a refractory material, consisting of the following ingredients substantially in the proportion specified by weight, finely-divided aluminium, one (1) part, ferric oxid, three (3) parts, titanic iron ore, containing approximately sixty per cent. of titanic oxid, four (4) parts, and a binding agent.

3. A compound to form a refractory material, consisting of the following ingredients substantially in the proportions specified by weight, finely-divided aluminium one part, ferric oxid three parts, titanic iron ore, containing approximately sixty per cent. of titanic oxid, four parts, and a binding agent, consisting of a solution of ammonium chlorid of acid reaction.

In testimony that I claim the foregoing as my own I have hereto affixed my signature in the presence of two witnesses.

GUILFORD C. GLYNN.

Witnesses:
   JNO. F. GOSHORN,
   FRANK B. SMITH.